United States Patent
Juntti et al.

(10) Patent No.: US 6,678,314 B2
(45) Date of Patent: Jan. 13, 2004

(54) SPREADING FACTOR DETERMINATION

(75) Inventors: Markku Juntti, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 96 days.

(21) Appl. No.: 09/942,315

(22) Filed: Aug. 29, 2001

(65) Prior Publication Data

US 2002/0110140 A1 Aug. 15, 2002

Related U.S. Application Data

(63) Continuation of application No. PCT/EP00/12204, filed on Dec. 1, 2000.

(51) Int. Cl.[7] .............................. H04B 1/69; H04B 7/216
(52) U.S. Cl. ..................................... 375/150; 370/342
(58) Field of Search ................................ 375/150, 140, 375/143, 130, 152; 570/320, 335, 342

(56) References Cited

U.S. PATENT DOCUMENTS

| 5,689,511 | A |   | 11/1997 | Shimazaki et al. |
| 5,748,668 | A | * | 5/1998 | Tomita et al. ............... 375/130 |
| 6,292,519 | B1 | * | 9/2001 | Popovic ........................ 375/346 |
| 6,532,250 | B1 | * | 3/2003 | Palenius et al. ............. 375/141 |

FOREIGN PATENT DOCUMENTS

| WO | WO 96/36132 | 11/1996 |
| WO | WO 99/03225 | 1/1999 |

OTHER PUBLICATIONS

Ojanpera et al., "Design of a $3^{rd}$ Generation Multirate CDMA System With Multiuser Detection, MUD–CDMA", 1996 IEEE $4^{th}$ International Symposium On Spread Spectrum Techniques and Applications Proceedings, Proceedings Of ISSSTA 1995 International Symposium On Spread Spectrum Techniques and Applications, Mainz, Germany, Sep. 22–25, 1996, pp. 334–338.

International Search report for PCT/EP00/12204.

* cited by examiner

Primary Examiner—Khai Tran
(74) Attorney, Agent, or Firm—Squire, Sanders & Dempsey L.L.P.

(57) ABSTRACT

The present invention relates to a method and circuitry for determining a spreading factor in a communication system with variable data rates. In such a system the received signal may include a plurality of data symbols that are spread in the transmission signal in a manner that is defined by a spreading code and a spreading factor, the spreading factor being one of a plurality of possible spreading factors. In accordance with the method, the received signal is processed so as to produce signal outputs which are cleared from the effects of the spreading code, autocorrelation values are computed for the signal outputs, and the spreading factor is determined based on the computed autocorrelation values.

24 Claims, 2 Drawing Sheets

SPREADING FACTOR DETERMINATION

This is a Continuation of application Ser. No. PCT/EP00/12204, filed on Dec. 1, 2000.

FIELD OF THE INVENTION

The present invention relates to spreading factor detection, and more particularly, but not explicitly, spreading factor detection or determination in a communication system that is based on direct sequence spread spectrum technique or any analogous technique.

BACKGROUND OF THE INVENTION

In a communication system data is transmitted as a plurality of data symbols in subsequent data or radio frames. The signals carrying the data may be transmitted with variable data symbol transmission rates (data speeds), wherein the transmission rate may be different in subsequent frames of the transmission. For example, in a cellular CDMA (Code Division Multiple Access) system data is encoded for transmission by processing data symbols to be transmitted by a spreading code for each transmission channel. The effect of a spreading code is to spread the frequency band of a transmission to a chip rate which is larger than the actual data or information symbol rate. This results that more symbols is transmitted than what the actual number of information symbols is since at least some of the symbols are repeated. For example, if the used spreading factor is eight, eighth symbols (referred to as "chips") are transmitted for every information symbol.

According to one possibility the length of the spreading code (i.e. the number of "chips" per a data symbol) is defined by a spreading factor. It is, however, noted that the length of the spreading code may also remain constant, i.e. the length thereof may not necessarily depend on the data rate. The spreading factor is sometimes expressed by a definition 'chip rate': 'data symbol rate' or by 'data symbol duration': 'chip duration', wherein the 'data symbol duration' equals 1: 'data symbol rate' and the 'chip duration' equals 1: 'chip rate'. The term spreading factor will be used in the following, although also other terms, such as spreading ratio or processing gain, may sometimes be used in this context.

It is possible to set up such a variable-rate (multi-rate) connection where the data symbol rate of the information symbols or bits, and thus the spreading code used in the spreading modulation of these symbols, may vary from frame to frame (e.g. every 10 ms). The data rates used in such a connection are not arbitrary, but for each frame duration, one of the plurality of predefined data rates is used. Moreover, although not necessarily so, every higher data symbol rate may be dividable by a lower data symbol rate, the division factor being for example $2^k$ for $k \geq 0$. This specification presents an example employing variable-rate connection spreading factors 4, 8, 16, 32, 64, 128 and 256 and corresponding data rates. However, it is evident that also other spreading factors and data rates may be used without departing from the basic concept of the variable data rate (or multi-rate) transmission. To give an example of a possible relation between the spreading factors (SF) and the data symbol rates, in a CDMA with a chip rate of 4.096 MHz the relation may be such that spreading factors 4, 8, 16, 32, 64, 128 and 256 correspond data rates 1024, 512, 256, 128, 64, 32 and 16 ksps (kilosymbols per second), respectively. However, the relation between the spreading factors and data rates may be different. For example, factors such as the number of code channels and the employed channel coding method and possible use of puncturing may influence the relation between the end user bit rate and the spreading factor.

When a signal is transmitted between a base station and a mobile station (either on the uplink or the downlink) in a communication system that is based on direct sequence spread spectrum technique, the receiving station may need to establish from the received signal some information about the communication path along which the signal has travelled. This procedure is referred to herein as "channel estimation". The channel estimation is typically carried out in a channel estimation entity. Various techniques are known for channel estimation. A channel impulse response generated by the estimation entity is required in order to properly decode and process incoming data.

In case a dedicated data channel is used for the channel estimation, it is possible to use the spreading factor and/or the data transmission rate of the received signal in the channel estimation. It is also possible, and in some cases even necessary, to utilise spreading factor information when estimating signal-to-interference ratio (SIR) in a data channel. However, if the spreading factor and/or data rate of a received radio frame is not directly available at the receiving station, the correct or most probable value thereof has to be determined by some means, e.g. by trying several possible data spreading factors for the transmission. For example, in the CDMA the data symbols in said radio frame are usually obtained by means of detecting the complex data symbols assuming that the highest-possible data symbol rate is used for transmission, and using the lowest-possible spreading factor in the receiving station. For example, when the length of the spreading code depends on the spreading factor, the shortest possible spreading code (e.g. with spreading factor SF=4) has to be known so that all the other spreading codes can be constructed from the shortest spreading code by multiplying the shortest spreading code by an integer. In practice, if the turnover time of the spreading code, i.e. the spreading factor, is not known, the receiver unit must perform the first despreading based on an assumption that the shortest possible code (minimal SF) was used for the transmission. For example, assuming that the data rate of the received radio frame was 1024 ksps in the first place, this corresponds to the spreading factor of 4 (at 4.096 Mcps) used in the detection of the data symbols. The result of this detection should be a data vector of all detected complex information symbols corresponding to the received radio frame.

The components of a signal that has propagated over a multipath channel have to be combined or summed at the receiver end in order to receive a signal that corresponds the original signal prior spreading and transmission. An example of the combination techniques is so called maximal ratio combination (MRC). The MRC is based on computing a weighted average for the signal components such that more weight is given for the signal components that have travelled over the strongest signal paths.

However, after combining the spread signal a correct spreading factor has to be used, otherwise the received data cannot be properly represented or used otherwise and/or will be lost. Therefore the above assumption of the data rate may not be enough, but a more accurate determination of the actual data rate of the signal at the transmitting station during the transmission may be required. For example, if the basic assumption is incorrect, this stage may then give a decision that instead of the assumed and initially used 1024 ksps (with spreading factor 4 and frequency 4.096 MHz) the actual data rate in the received radio frame was 256 ksps (corresponding to the spreading factor of 16). After the determination, as many adjacent samples or chips as is indicated by the spreading factor are summed together to get one actual data symbol. In the above example, this would lead to summing up every four adjacent samples to get one actual data symbol (4×4=16). Therefore it would be advantageous to be able to have information of the actual data symbol rate and/or spreading factor of the transmission already at the time of the detection of the signal at the receiver circuitry.

The transmission between the stations may or may not include explicit information of the spreading factors and/or data rates of the transmitted signal. If the variable-rate connection includes explicit information on the used spreading factors and/or data rates for each received radio frame, this information is usually given in a separate channel, for example in an DPCCH (Dedicated Physical Control Channel). However, this information is often encoded and/or interleaved over several frames in such a way that the actual data rate of the received radio frame is not known at the time the data symbols of the radio frame are detected. In addition, it may be necessary in some applications to be able to establish another estimate of the data rate or spreading factor information, for example for the purposes of verification and/or correction of the received data rate information.

In the latter case, i.e. if the explicit information is not included in the received signal, a unknown rate or blind rate estimation is to be employed at the receiving station in order to define at the receiver the spreading factor and/or the data rate of the received signal. Therefore a mechanism may be needed for estimating the data rate and/or spreading factor in a receiving station (e.g. a base station or a mobile station). This estimate may be desirable, for example, when this information is not available, or when an early estimate of the data rate is required before decoding, or when a confirmation of data rate information received from the transmitting station is desired.

One prior art proposal for detecting the data rate of the received signal before the decoding is based on the power difference of the received bits in the data channel (dedicated physical data channel: DPDCH) and the control channel (dedicated physical control channel: DPCCH). In other words, the method is based on monitoring the power ratio between the data and control channels. The method is relatively simple as it requires only the average power estimates of the received control symbols and data symbols. However, the spreading factor is not directly dependent from power ratio in all code division communications systems. A further disadvantage of the power ratio method is that it is not very accurate and/or reliable. Especially, if a high spreading factor is used in detecting the data symbols (SF=256 in the above example) in the first place, noise becomes very dominant in the detection process. This degrades substantially the performance of the data symbol power estimation.

Another prior art method is based on CRC (Cyclic Redundancy Check: an error detection signal) decoding of the received signal. In here a convolutional error control code or any other appropriate error control code (e.g. so called turbo code that is often applied for high-speed data transmission) is decoded for each possible spreading factor and a CRC check is accomplished for the results. If a correct CRC is detected, a correct data rate has been found. In other words, the method is based on a data rate assumption at each decoding stage and a subsequent selection of a data rate which gives either a correct or an incorrect CRC word. To give an example, assuming again that the possible data rates are 32, 64, 128, 256, 512, and 1024 ksps, a CRC check would be calculated directly for the information symbols of the received radio frame by assuming firstly a data rate of 1024 ksps. The resulting CRC word is stored. Two adjacent received symbols are summed together, assuming a data rate of 512 ksps, and a further CRC check is calculated for these information symbols. The resulting CRC word is stored. The process continues summing two adjacent information symbols together and calculating CRC checks for all these information streams until a lowest-possible data rate is achieved. Thereafter the stored CRC words are verified and such a data rate is selected that corresponds the rate used in the transmitter when a right CRC check was obtained (if such existed at all).

However, the CRC method is computationally complex and involves a substantially large amount of processing since the convolutional error control code or similar must be decoded for each possible frame length. If there are N possible data rates, this requires N consequent CRC decoding processes before a decision of the transmitter data rate can be made. In addition, the spreading factor detector based on the CRC has to be located after the decoding stage, and the data rate for a frame can be calculated only after the entire radio frame has been received. This delay is increased if frame interleaving is employed. Thus this method cannot be used e.g. when the spreading factor has to be known all the time during the receiving process, and the CRC check may not be applied in applications where the data rate information has to be available before the entire radio frame has (or interleaved frames have) been received. The above method delays the final decision of the data rate of the received signal to a stage where at least some decoding of the data is needed for the first time. This will make the operation more complex and difficult especially for receiver structures that require an estimate of the data transmission rates of the received signals at an earlier stage than the first decoding. An example of such receiver is an Interference Cancellation (IC) receiver. Moreover, the method does not give any data rate at all if the algorithm does not give an exactly matching CRC check.

SUMMARY OF THE INVENTION

It is an aim of the embodiments of the present invention to address one or several of the disadvantages of the prior art and/or to provide a new type of solution for spreading factor and/or data rate detection.

According to an aspect of the present invention there is provided a method for determining a spreading factor for a signal in a communication system with variable data transmission rates, wherein the received signal includes a plurality of data symbols that are spread in the signal in a manner defined by a spreading code and a spreading factor, the spreading factor being one of a plurality of possible spreading factors, comprising:

processing the received signal so as to produce signal outputs which are cleared from the effects of the spreading code;

computing autocorrelation values for the signal outputs; and determining the spreading factor that was used for the signal based on the computed autocorrelation values.

According to another aspect of the present invention there is provided a circuitry for determining a spreading factor for a signal in a communication system with variable data transmission rates, wherein the received signal includes a plurality of data symbols that are spread in the signal in a manner defined by a spreading code and a spreading factor, the spreading factor being one of a plurality of possible spreading factors, comprising:

means for processing the received signal so as to produce signal outputs which are cleared from the effects of the spreading code;

means for computing autocorrelation values for the signal outputs; and means determining the spreading factor that was used for the signal based on the computed autocorrelation values.

According to a further aspect there is provided a method for determining a spreading factor for a signal in a communication system with variable data transmission rates, wherein the received signal includes a plurality of data symbols that are spread in the signal in a manner defined by a spreading code and a spreading factor, the spreading factor being one of a plurality of possible spreading factors, wherein the determination method comprises at least two stages, said at least two stages being based on different principles of spreading factor determination.

The embodiments of the present invention provide several advantages. The embodiment may provide a simple solution for detection and computations of the spreading factor. The spreading factor may be detected before decoding. Thus the embodiments may be used in applications where the spreading factor must be known all the time. The possibility of detecting the spreading factor prior to decoding may also be advantageous when multiple access interference (MAI) cancellation is applied in the receiver. The embodiments of the invention may be applied to provide a spreading factor or data rate estimate when no rate information is transmitted. The embodiments of the invention may be applied when the rate information is transmitted but cannot, for reason or another, be used or detected from the signal during the receiving process. One possible use of the embodiments is to provide an additional data rate information which can be used e.g. for correction or error check of a rate information detected from the transmitted signal. The possibility for an early detection of the unknown data rate may enable use of any such receiver structure which makes use of the data rate information at an early stage. The estimate may also be used to assist in rate selection for applications such as Viterbi decoding of the incoming data symbols, or to assist in decision of an alternative transmission rate for decoding if an error check fails.

BRIEF DESCRIPTION OF DRAWINGS

For a better understanding of the invention and to show how the same may be carried into effect reference will now be made by way of example to the accompanying drawings in which.

DESCRIPTION OF PREFERRED EMBODIMENTS OF THE INVENTION

Figure 1:
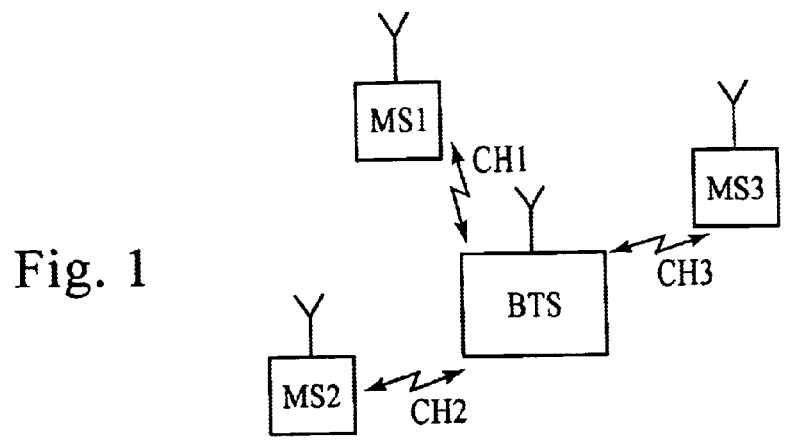
FIG. 1 is a block diagram of a mobile communication system.
Figure 2:
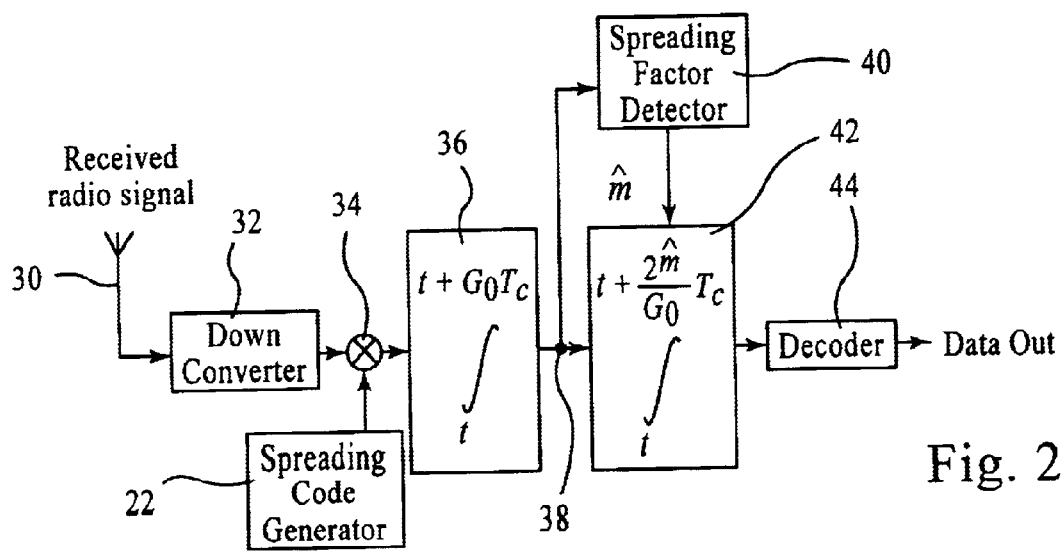
FIG. 2 illustrates a reception circuitry in a station.

FIG. 1 is a block diagram illustrating a context in which the present invention may be used. That is, a CDMA mobile communication system that allows a plurality of mobile stations MS1, MS2, MS3 to communicate with a base (transceiver) station BTS in a common cell via respective channels CH1, CH2, CH3. These channels are distinguished from one another by the use of scrambling codes in a manner which is known in the art. FIG. 2 is an exemplifying block diagram of a possible receive circuitry at a base station in a WCDMA system (Wideband CDMA). The receive circuitry of FIG. 2 is for use in uplink direction, i.e. for receiving signals from the mobile stations (MS). It is noted that even though not discussed in the following, the embodiments may be implemented also in the downlink direction, i.e. at the mobile station.

Before describing the exemplifying receiving circuitry of FIG. 2 that employs an embodiment of the invention, an exemplifying transmit circuitry (not shown) within a transmitting station will be briefly described. Data to be transmitted between a mobile station (MS) and a base transceiver station (BTS) may be speech data, video data or other data. The data is encoded into a form suitable for transmission at a bit rate which is dependent on the source of the data. The encoded user data is typically supplied to a frame multiplexer. In some embodiments the user data may also be supplied to a CRC encoder which generates a check sequence (CRC) for each frame of data. Error correction coding and bit interleaving of the frame sequence may be accomplished prior to transmission in a manner known in the art. The error correction is used in order to protect the user data from errors in a radio channel so that e.g. a Viterbi decoder can recover the coded data even if some of the bits are corrupted. For error coding and decoding purposes, tail bits defining the end of each user data sequence may also be added to the end of user data sequence. Bit interleaving spreads burst errors which typically occur in radio channels more evenly in time to allow the decoder to more efficiently correct the errors from the encoded data.

Figure 3:
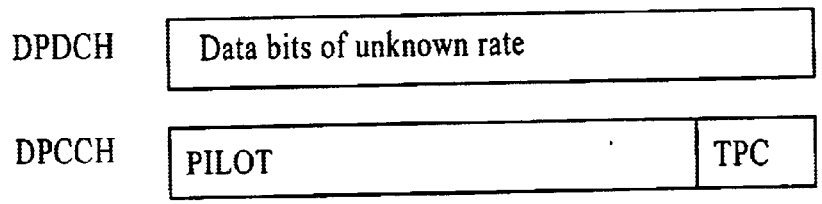
FIG. 3 illustrates a slot structure for physical channels for a transmission with unknown data rate.

A frame multiplexer organises the data for transmission into a frame sequence. FIG. 3 illustrates an example of a slot structure for physical channels DPCCH (Dedicated Physical Control Channel) and DPDCH (Dedicated Physical Data Channel) in the frame sequence. The DPCCH part of the frame contains a pilot sequence (PILOT), a possible but not necessary rate information (RI) sequence (not shown) and a transmission power control (TPC) sequence. The DPDCH part of the frame contains the whole interleaved user data sequence (user bits and possible CRC bits and possible tail bits). Typically, the user data of the DPDCH is divided into frame periods, such as periods of 10 milliseconds each. Each frame can be transmitted with a different rate. Thus, the transmitter is enabled to multiplex data from different sources into the frame sequence for transmission and to provide different transmission rates in different frames of the frame sequence. In the following exemplifying embodiments the data rate detection at the receiver is subjected to the DPDCH sequence of the frame.

The frame sequence is typically supplied to a spreader which receives spreading and possible scrambling codes from a code generator. The spreading and possible scrambling codes may be generated in accordance with known CDMA techniques and will thus not be described further herein. The effect of the spreading code is to spread the frequency band for transmission to a chip rate which is larger than the data symbol rate. If M parallel code channels are employed, M data symbols are spread using different spreading codes and then the results are summed together. The spread signal is then typically supplied to a modulator which modulates the signal ready for transmission, for example according to QPSK modulation. In some systems, modulation may be carried out prior to spreading. This sequence of events, however, has no impact on the present invention. The signal is then typically be supplied to a digital to analogue (D/A) converter and further to an RF (radio frequency) unit which supplies the spread signal ready for transmission.

The present invention relates to the reception side of the transmission. The reception of the spread spectrum signal will now be described with reference to the FIG. 2 example. Signals incoming at an antenna 30 may be received by an RF unit (not shown) and supplied to an analogue to digital (A/D) converter (not shown). It will readily be understood that a signal may arrive at the receiving station having experienced multipath channels with differing propagation delays. Thus samples or a portion of the digital signal may also be provided to a synchronisation unit (not shown). The synchronisation unit handles the synchronisation between the mobile station and the base station BTS after power has been turned on as well as in a handover case. The synchronisation procedure includes searching for signals which have been transmitted with a scrambling code that is unique for that particular transmitting station. The synchronisation unit receives the unique code from a code generator (not shown). To perform the search function, the synchronisation unit correlates the unique code with the incoming signal until a strong correlation is detected. After the synchronisation procedure is completed, a dedicated traffic channel can be established between the transmitting and receiving stations.

The signal processing circuitry of FIG. 2 comprises a downconverter 32 for dowconverting the signal received by the antenna 30. A multiplier 34 is located on the signal path after the downconverter 32. A spreading code generator 22 is also provided to generate spreading codes for the multiplier 34. An integrator block 36 is located after the multiplier 34. An example of the operation of the block 36 will be explained in more detail below. The correlation of the received signal by the spreading signal may be implemented by means of co-operation of the multiplier 34 and the integrator 36.

The circuitry comprises further a spreading factor detector 40 for processing samples of the signal so as to provide a spreading factor detection function that is based on an autocorrelation function, as will be explained in more detail later. The detected spreading factor may be used in further processing of the received signal. The samples may be obtained at point 38 on the signal path after the correlation function implemented by the elements 34 and 36. It is also possible to sample the signal before the combining and/or correlating stage of the signal. In a preferred embodiment the information that is input into the detector 40 comprises soft symbols that are derived from the signal.

The estimator 40 may be implemented, for example, by using a digital signal processor (DSP) or several DSPs. An advantage of the DSPs is that they enable a flexible implementation of the estimation unit. An alternative is to implement the estimator 40 by means of an application specified integrated circuit (ASIC) or several ASICs. Another possibilities include means such as a field programmable gate array (FPGA) or a general purpose data processing device. However, it is to be appreciated that also other types of processing arrangements are possible in this context. The general architecture of the processing functionality may also vary, and it is possible to distribute the various functions required in the detection process to several separate and/or different processing units, as may be appropriate.

An estimate of the spreading factor is needed from the detector unit 40 in order to be able to decide how many successful data symbols are to be summed together. The operation of the unit 40 will be discussed in more detail below when explaining possible methods for the spreading factor estimation embodiments.

After the determination of the spreading factor and/or data symbol rate it is possible to accomplish a final despreading of the signal at despreader 42. The completely despread signal may then be subjected to further processing, such as channel decoding at a channel decoder 44 and so on.

It is noted that several alternative circuit structures to the embodiment shown in FIG. 2 are possible to implement the embodiments of the present invention.

Figure 4:
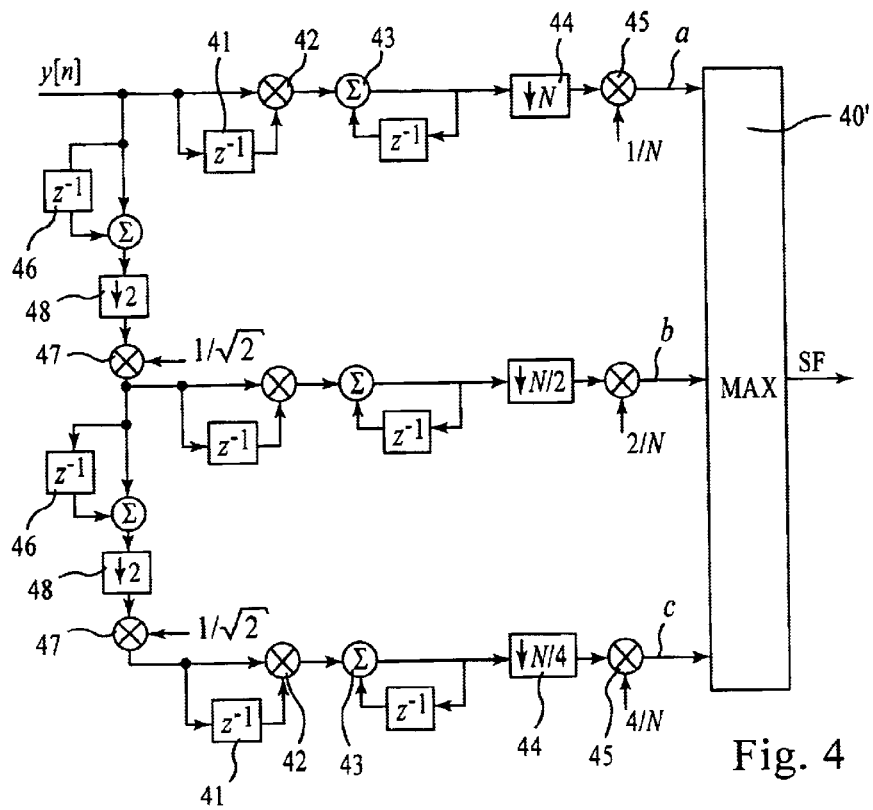
FIG. 4 illustrates one embodiment of the invention.

The following will describe, with reference to FIG. 4, an embodiment for estimating the spreading factor. The operation of an autocorrelation based spreading factor (SF) detector 40' may be based on a dedicated data channel frequency estimation. According to a possibility a maximal ratio combined (MRC) signal is firstly correlated with possible spreading codes using different spreading factors. It is noted that in this context the "correlation" refers to integration (i.e. despreading) and downsampling of the signal to the assumed data symbol rate by the spreading code so that the effects of the spreading code are removed from the signal. The correlation may also be accomplished before the combination. The term "autocorrelation" refers to computation of autocorrelation values that are computed for the outputs of a correlator performing the correlation of the signal. An autocorrelation function, such as an one step autocorrelation function, is preferably calculated for each correlator output of the dedicated data channel. The spreading factor may then be determined based on the results of the autocorrelation computations.

According to a preferred embodiment the spreading factor can be defined based on the maximum value obtained by the computations. The selection of the maximum value is based on the founding that the maximum value is provided when the correlation slot is correct, i.e. when the data symbol under consideration becomes correlated with a data symbol that correlates best with it. If the sampling slot is too short the data symbols cannot be properly correlated. Thus the correlator output value will be smaller than the possible maximum value since the correlation is "poorer" than what it would be with a correct correlation slot. If the correlation slot is too long, the data symbols do not have any dependency or only a small dependency with each other and the average or expected output value will be zero or close to zero.

It is noted that instead of processing the signal by a correlation function, the effects of the spreading code may also be cleared from the signal by other appropriate means. An example of the other appropriate means is a matched filter and a subsequent sampling to a different data symbol rate.

The correlation output $Y_m$ for spreading factor n may be obtained from equation:

$$y[n] = \frac{1}{\sqrt{G_0}} \text{Re}\left[\sum_{l=1}^{L} \hat{c}_l^* \int_{t=n4T_c}^{(n+1)4T_c} r(t)s(t - n4T_c - \tau_l)dt\right], \quad (1)$$

In the above equation $G_0$=smallest possible spreading factor, L=the number of signal propagation paths (e.g. the number of RAKE branches), $c^{\hat{}}_1{}^*$=complex conjugate of the channel estimate, $T_c$=chip duration, r=the received signal (in relation to time t), and $\tau_1$=the delay of the propagation path L in relation to the other propagation paths.

The division by $\sqrt{G_0}$ is included in (1) because of mathematical convenience. More particularly, it may be used since the noise terms are zero mean Gaussian random variables with an equal variance. It is noted that although the normalisation is preferred as it simplifies the computations, the normalisation is not always necessary for the operation of the invention. In addition, the normalisation may be accomplished by means of other normalisation methods than the one described herein.

As the possible spreading factors are of the form $G_m = 2^m G_0$, the correlator output for the $m^{th}$ spreading factor hyphotesis:

$$y_m[n] = \frac{1}{\sqrt{G_m}} \sum_{n'=nG_m}^{(n+1)G_m - 1} s^*[n']r[n'] \qquad (2)$$

($s$ = the overall spreading signal)

equals:

$$y_m[n] = \frac{1}{\sqrt{2^m}} \sum_{i=0}^{2^m - 1} y[2^m n + i], n = 0, 1, \ldots, \frac{N}{2^m} - 1, \qquad (3)$$

($N$ = the length of the observation window).

In other words, the output equals to y[n] that is correlated (summed and downsampled) by factor $2^m$.

The final decision rule can then be expressed as:

$$\hat{m} = arg \max_{m \in 0, 1, \ldots, M-1} \Omega_c(m), \qquad (4)$$

wherein $$\Omega_c(m) = \frac{2^m}{N} \sum_{n=0}^{\frac{N}{2^m}-1} y_{m-1}[2n] y_{m-1}^*[2n+1]. \qquad (5)$$

The above procedure has been illustrated by FIG. 4, wherein the received signal y[n] is assumed to have three possible different spreading factors that are processed in respective calculation branches. In computations for the correlator output the minimum spreading factor is assumed to be 4. To simplify the computations further, the assumed minimum spreading factor is divided by 2. In addition, the above discussed $\sqrt{G_0}=\sqrt{2}$ is used for the division of the signal sample. The maximum of the values produced by the three branches a to c is then selected at a block 40'. The spreading factor SE is determined based on this selection.

More particularly, a delay j that equals one sample is accomplished in each of the branches at 41 (i.e. in FIG. 4 and in the equation (5) j=1). The autocorrelation of the data symbols is accomplished in each of the branches at multipliers 42. Thereafter the results are averaged over N symbols at adders 43 by means of a recursive summing. The results are dowsampled at blocks 44 by the number of samples (N) and divided by the number of samples at blocks 45 before the resulting values of the branches a to c are input in the selection block 40'. In the upmost branch a it is assumed that spreading factor is the smallest possible spreading factor. In the second (middle) branch b it is assumed that the spreading factor is twice the smallest possible spreading factor, and thus the sample is multiplied by $1/\sqrt{2}$ at 47 between the subsequent branches. A recursive summing is accomplished between the branches at 46. In addition, the samples are downsampled by two at 48 between the branches (i.e. every other sample is ignored). The functions 46 and 48 provide in combination the correlation function referred to above. It is noted that the delay function provided at 47 may also be positioned otherwise than what is disclosed by FIG. 4. The blocks 44 and 45 in branches b and c are provided with factors 2 and 4, respectively in order to take the different number of samples (due to the downsampling between the branches at 48) into account.

Figure 5:
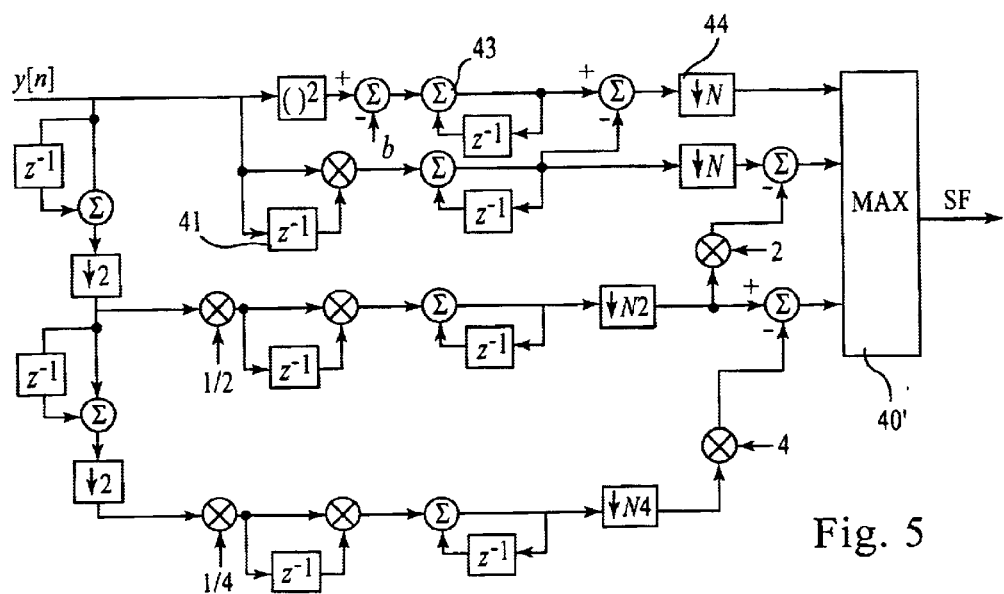
FIG. 5 illustrates another embodiment of the invention.

FIG. 5 shows another possibility for determining the spreading factor. In this example it is also assumed that the maximal ratio combination (MRC) is performed based on the assumption that the smallest possible spreading factor is used for the transmission. In the following the smallest possible spreading factor SF is assumed to be 4. The correlation after the MRC for all other spreading factors may then be carried out (correspondingly to equations 2 to –5, but computed with a different scaling and by employing a step size vector (8)) as:

$$y_m[n] = \frac{1}{2^m} \sum_{i=0}^{2^m - 1} y[2^m n + i], \qquad (6)$$

$$m = 0, 1, \ldots, M - 1,$$

$$n = 0, 1, \ldots, \frac{N}{2^m} - 1.$$

wherein $y_m$ is the correlator output for spreading factor m, M is the number of possible spreading factors, and N is the length of the observation window. If the spreading factor is bigger, the number of samples in the correlation window is correspondingly smaller. Correspondingly, if the window is relatively long, then the number of values for which an autocorrelation is computed will become smaller.

The sample autocorrelation function for a delay of j between subsequent samples may then be calculated from each correlated symbol by equation (j=1 in the following):

$$\hat{R}_m[j] = \frac{1}{\frac{N}{2^m}} \sum_{n=0}^{\frac{N}{2^m}-1} y_m[n] y_m^*[n+j], \qquad (7)$$

$$m = 0, 1, \ldots, M - 1.$$

It is possible to determine so called step size vector (SV) from correlation vector:

$$SV = (\hat{R}_0[0] - \hat{R}_0[1] - I_0 \hat{R}_0[1] - \hat{R}_1[1] \hat{R}_1[1] - \hat{R}_2[1] \ldots \hat{R}_{M-2}[1] - \hat{R}_{M-1}[1]). \qquad (8)$$

Spreading factor decision may now be based on:

$$SF = 2^m \times 4 \qquad (9)$$

where m is the index that is based on the maximum value of the step size vector SV. For example, if the first element of the step size vector SV is found to be the maximum of the elements of the SV, the decision is m=0, and the corresponding spreading factor can be defined to be $2^m \times 4 = 2^0 \times 4 = 4$. Correspondingly, if the second element of the SV is determined to be the maximum value element, the decision is m=1, and the spreading factor is $2^1 \times 4 = 8$. Similarly, if the $3^{rd}$ element is determined to have the maximum value, then m=2, if the $4^{th}$ element is the maximum, then m=3 and so on. This principle is illustrated in FIG. 5 for M=3 possible spreading factors. When compared to FIG. 4, it will be readily noted that the division by $\sqrt{2}$ will make the computations somewhat simpler.

The performance of the above discussed embodiment has been tested by simulations. From the results it was concluded that the proposed embodiments may give a simple and promising solution to the blind spreading factor and/or data rate detection. The simulations indicated also that reliable estimates are also provided in various different conditions, such as for a fading channel with fast transmission power control (TPC) or in a rake receiver. The rake receiver can be defined as a receiver that is arranged to have several signal receiving branches that receive multipath components of the signal and to combine the signal components to form a received signal.

According to a further embodiment the reliability of the spreading factor and/or data rate detection can be further improved by performing the spreading factor detection in two or more cascaded stages or based in two or more sources of information about the spreading factor and/or the data symbol rate.

According to a possible implementation of the multistage spreading detection a rough decision of the spreading factor is made. For example, it can be decided that the spreading factor is either 4, 8 or 16 when the possible spreading factors are 4, 8, 16, 32, 64 and 128. By means of this it is possible to cut the number of possible spreading factors to half of the original possibilities. The final decision is then made by another, and computationally more requiring spreading factor decision algorithm, such as the ones discussed above. According to another possibility a priori information of the possibilities is used when excluding one or more of the less possible spreading factors or any impossible spreading factors.

The advantage of the multistage embodiment is that a simple spreading factor detection algorithm, such as a power ratio based algorithm, may be used to provide a rough decision and to exclude one or more of the less probable possibilities. By means of this it may be possible to decrease the amount of required computations in a second decision stage where a more accurate algorithm may then be used. The first stage rough decision may also be based on or replaced by information received from the system and/or with the signal.

As already mentioned, when a signal is transmitted between a base station and a mobile station in a communication system that is based on direct sequence spread spectrum technique, the receiving station may need to perform a channel estimation in order to reproduce a signal that corresponds the original signal before the transmission. The embodiments of the invention may be used in the channel estimation. In addition, signal-to-interference ratio (SIR) estimation in a data channel of communication system that is based on direct sequence spread spectrum technique may also be based on a spreading factor that is determined in accordance with the above discussed embodiments.

Although the invention has been described in the context of a CDMA based system, it will be appreciated that similar principles can be applied in other communication systems, for example in a TDMA system or in any telecommunications device receiving data symbols at variable rates and requiring information of the spreading factor or the data transmission rate, such as in modems.

While the invention has been described above in connection with the blind data rate detection, the described data rate estimation method could be used together with rate information bits or similar data rate information in order to produce verified and/or corrected data rate estimate. This is a viable alternative especially in implementations having high requirements for the accuracy of the transmission rate estimation.

It is also noted herein that while the above describes exemplifying embodiments of the invention, there are several variations and modifications which may be made to the disclosed solution without departing from the scope of the present invention as defined in the appended claims.

What is claimed is:

1. A method for determining a spreading factor for a received signal in a communication system with variable data transmission rates, wherein the received signal includes a plurality of data symbols that are spread in the received signal in a manner defined by a spreading code and a spreading factor, the spreading factor being one of a plurality of possible spreading factors, comprising:

processing the received signal so as to produce signal outputs which are cleared from the effects of the spreading code;

computing autocorrelation values for the signal outputs; and determining the spreading factor that was used for the received signal based on the computed autocorrelation values.

2. A method according to claim 1, wherein the smallest possible spreading factor of the plurality of spreading factors is employed when processing the signal to clear the effects of the spreading code.

3. A method according to claim 1, wherein the processing comprises correlation of the signal by despreading the signal based on at least one spreading factor of the plurality of possible spreading factors and downsampling the signal based on the spreading code to an assumed data symbol rate.

4. A method according to claim 3, wherein the signal is correlated with each possible spreading factor.

5. A method according to claim 3, wherein a maximal ratio combination signal is correlated with the at least one spreading factor.

6. A method according to claim 3, comprising the step of changing the spreading factor that is used for the correlation.

7. A method according to claim 1, wherein the processing comprises filtering the signal by a matched filter and sampling the signal to at least one different data symbol rate.

8. A method according to claim 1, wherein the data symbols are spread in a plurality of subsequent data frames.

9. A method according to claim 1, wherein a proportion of the smallest possible spreading factor of the plurality of spreading factors is employed when processing the signal to clear the effects of the spreading code.

10. A method according to claim 1, wherein the processing comprises correlating the signal by despreading the signal based on a proportion of each possible spreading factor of the plurality of spreading factors and downsampling the signal based on the spreading code to an assumed data symbol rate.

11. A method according to claim 9, wherein the proportion is obtained by dividing the spreading factor by a square root of 2.

12. A method according to claim 9, comprising correlating a maximal ratio combination signal based on the proportion of the smallest possible spreading factor.

13. A method according to claim 3, wherein the correlation is based on a possible spreading factor and the determination of the spreading factor is based on several autocorrelation stages.

14. A method according to claim 3, wherein the computing of the autocorrelation values comprises computing of an one-step autocorrelation function for each correlator output of a dedicated data channel.

15. A method according to claim 3, wherein the spreading factor is determined by selecting the highest value of the computed autocorrelation values.

16. A method according to claim 3, comprising computing the correlation for a predefined time slot and averaging the results for the predefined time slot.

17. A method according to claim 1, wherein an autocorrelation vector is computed for a predefined delay from each correlated data symbol, a decision metric vector is determined from the autocorrelation vector and the spreading factor is determined based on the decision metric vector.

18. A method according to claim 17, wherein the spreading factor is determined based on determination of an element of the subsequent elements of the decision metric vector that has the maximum value.

19. A method for channel estimation in a communication system that is based on direct sequence spread spectrum technique wherein the data symbol rate estimate is based on a spreading factor that is determined in accordance with claim 1.

20. A method according to claim 19, wherein the channel estimation is based both on a data rate information received from a transmitting station and the determined spreading factor.

21. A method for signal-to-interference ratio estimation in a data channel of communication system that is based on direct sequence spread spectrum technique wherein the signal-to-interference ratio estimation is based on a spreading factor that is determined in accordance with claim 1.

22. A method according to claim 1, comprising determining the spreading factor in more than one stage, wherein at least two different spreading factor determination methods are employed in the different stages.

23. A method for determining a spreading factor for a signal in a communication system with variable data transmission rates, wherein the received signal includes a plurality of data symbols that are spread in the signal in a manner defined by a spreading code and a spreading factor, the spreading factor being one of a plurality of possible spreading factors, comprising at least two stages, wherein one of the stages is as claimed in claim 1.

24. A circuitry for determining a spreading factor for a received signal in a communication system with variable data transmission rates, wherein the received signal includes a plurality of data symbols that are spread in the received signal in a manner defined by a spreading code and a spreading factor, the spreading factor being one of a plurality of possible spreading factors, comprising:

means for processing the received signal so as to produce signal outputs which are cleared from the effects of the spreading code;

means for computing autocorrelation values for the signal outputs; and means determining the spreading factor that was used for the received signal based on the computed autocorrelation values.

* * * * *